Feb. 21, 1939. M. SCHNEIDER 2,148,221
SPINNERETTE MANUFACTURING APPARATUS
Filed Oct. 7, 1935 7 Sheets-Sheet 6

Inventor
Max Schneider.
By Thomas H. Dyron
Attorney

Feb. 21, 1939. M. SCHNEIDER 2,148,221
SPINNERETTE MANUFACTURING APPARATUS
Filed Oct. 7, 1935 7 Sheets-Sheet 7
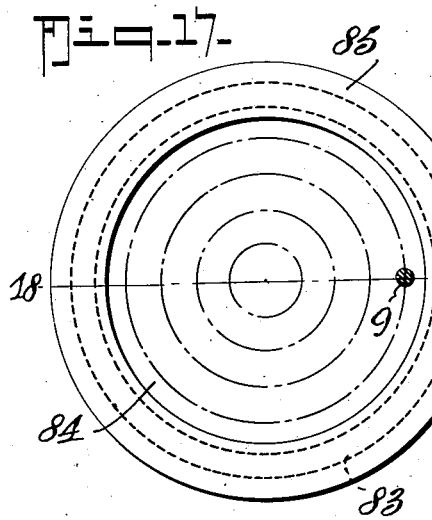
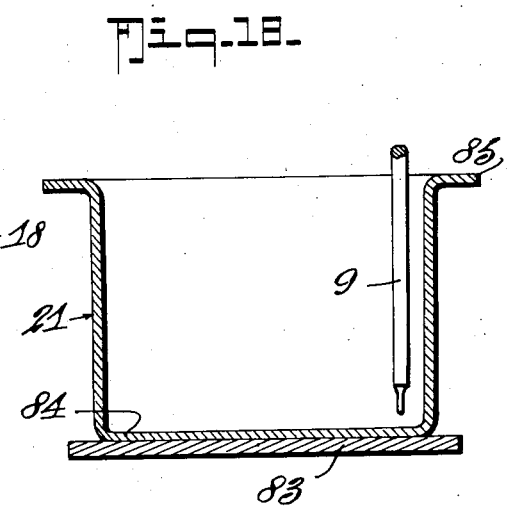
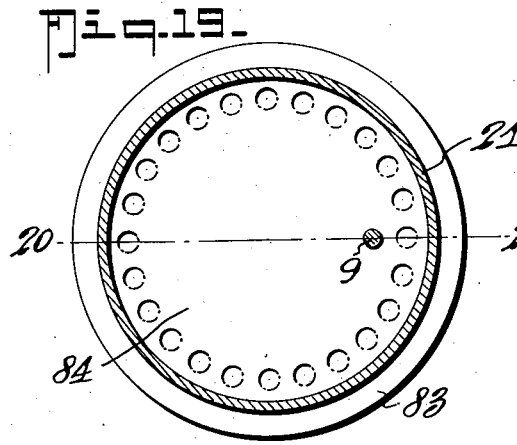
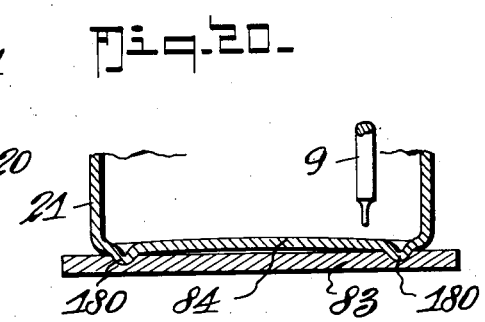
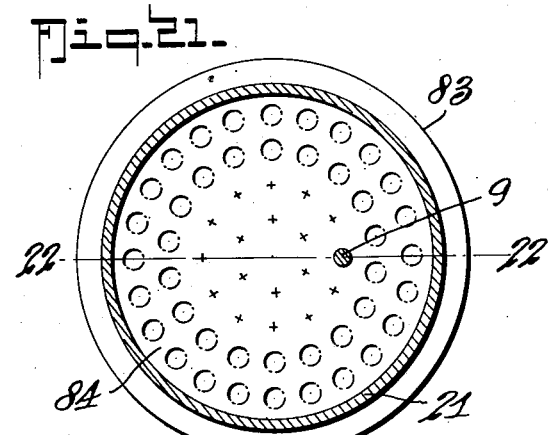
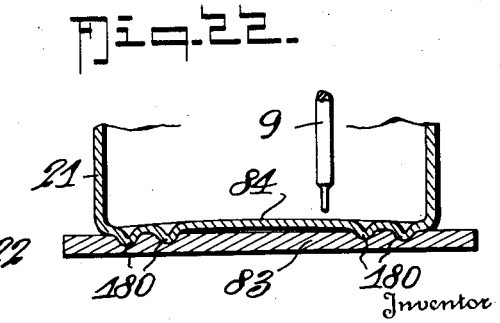
Inventor
Max Schneider.
By Thomas H. Byron,
Attorney Patented Feb. 21, 1939

2,148,221

UNITED STATES PATENT OFFICE 2,148,221

SPINNERETTE MANUFACTURING APPARATUS

Max Schneider, Elizabethton, Tenn., assignor to North American Rayon Corporation, New York, N. Y., a corporation of Delaware Application October 7, 1935, Serial No. 43,811

76 Claims. (Cl. 153—21)

This invention relates to a machine for stamping imperforate projections in a metal plate. More specifically the invention has for its purpose to provide a machine which will stamp hollow projections in the draw plate of a spinnerette or spinning nozzle such as is used in the manufacture of filaments or threads of artificial silk.

In the manufacture of spinnerettes for use in the extrusion of artificial filaments the first step in the process is the stamping out of the body of the spinnerette in the form of a cylinder closed at one end and having an outwardly extending annular flange at the other end. The closed end is called the draw plate and is that part of the spinnerette which has the openings formed therein through which the spinning solution is expressed or extruded. These openings are quite small and are usually made by forming hollow imperforate projections in the draw plate. The point of the inner surface of the hollow projection extends below the plane of the outer surface of the draw plate so that when the projection is subsequently removed by any suitable means, such as grinding it off, an opening appears. It is therefore readily seen that the depth to which the hollows of the imperforate projections extend governs the size of the opening which appears during the removal thereof.

The spinnerette is the heart of the spinning process in the manufacture of the threads of artificial silk and it is therefore of the utmost importance that the spinning or extrusion openings be of an accurate and uniform size. When it is further realized that each spinnerette has anywhere from 15 to 200 openings, each opening having a diameter of approximately 0.1 mm., the difficulties of obtaining a spinnerette having accurately and uniformly made openings are obvious.

It is therefore one object of the present invention to devise a stamping machine which will form projections of uniform depth.

Another object of the present invention is to devise a stamping machine which when a spinnerette is placed therein will stamp the required number of openings in proper spaced relation without further attention from the operator.

Still another object of the present invention is to devise an apparatus for stamping imperforate hollow projections in spinnerette draw plates which carries the depth to which the stamping needle drops as the resistance and level of the draw plate changes from outside to inside.

These and other objects will in part become obvious and will in part be pointed out in the following specification and appended claims when studied in conjunction with the attached drawings, in which, Fig. 1 is a front elevation of the apparatus comprising my invention, Fig. 2 is a rear elevation, Fig. 3 is an end elevation, Fig. 4 is a vertical cross-sectional view taken on the line 4—4 of Fig. 1, Fig. 5 is a horizontal cross-sectional view taken on the line 5—5 of Fig. 1, Fig. 6 is a horizontal sectional view taken on the line 6—6 of Fig. 2 showing in full lines the position of the parts when the work holder pattern is released for the purpose of rotating the spinnerette into position for the succeeding projection to be stamped.

Fig. 9 is an enlarged detail section of the clutch used for disengaging the drive shaft operating the releasing cam and driving disc of the work holder pattern.

Fig. 10 is a detail cross sectional view taken on the line 10—10 in Fig. 9.

Fig. 11 is a detail cross sectional view taken on the line 11—11 of Fig. 9.

Figure 1:
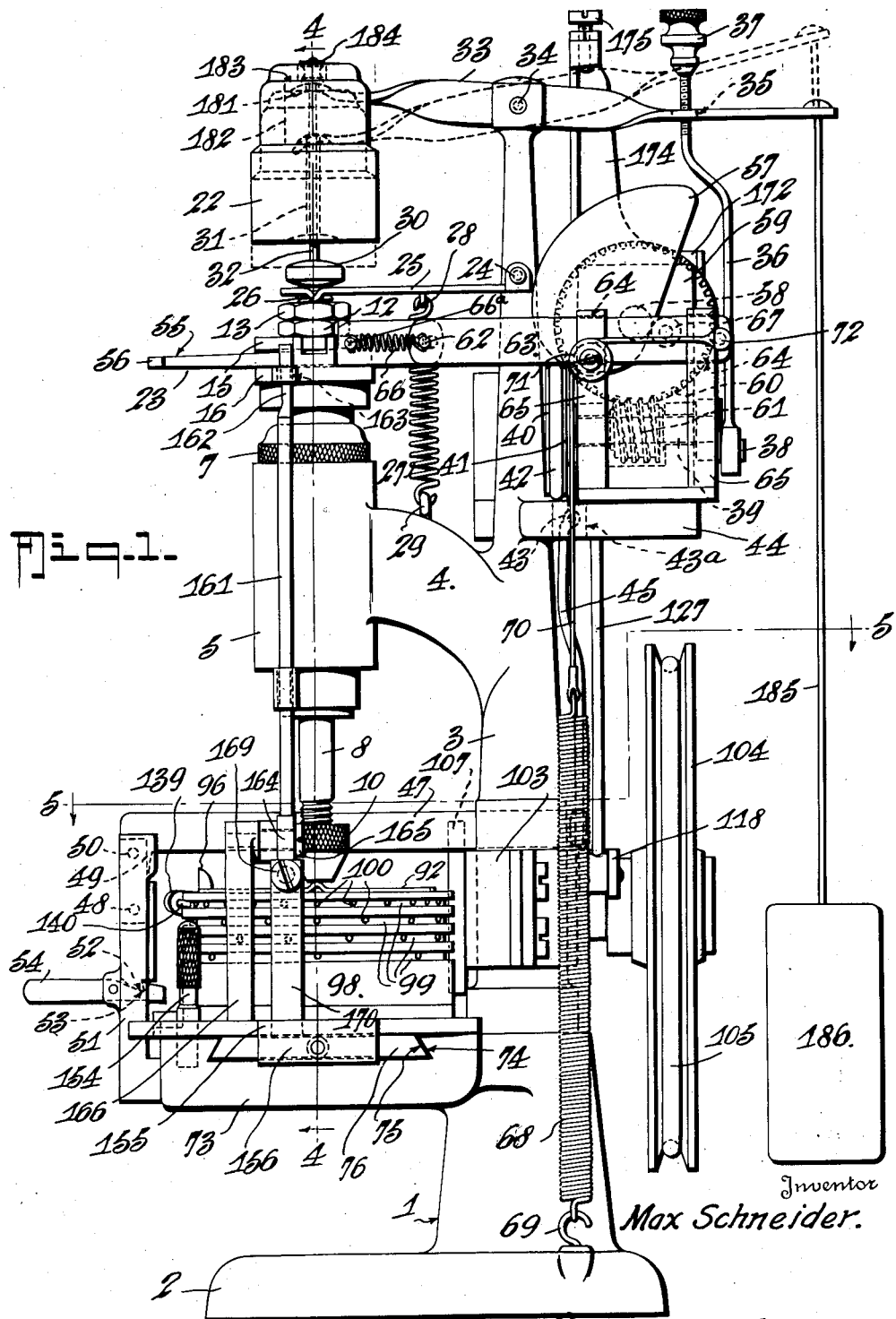

Fig. 13 is a side elevation of the control pattern which governs the position and number of the projections to be stamped in the spinnerette, Fig. 14 is a top plan view of the control pattern, Fig. 15 is an enlarged detail view of the lower end of the stamping needle and a section of the draw plate of a spinnerette illustrating the appearance thereof after a hollow imperforate projection has been stamped therein, Fig. 16 is a perspective view of a spinnerette cup such as is stamped by the device comprising the invention, Fig. 17 is an enlarged plan view of a spinnerette before the stamping operation has been started and showing in dot and dash lines the imaginary circles upon which the imperforate projections are stamped, Fig. 18 is a vertical cross-section on the line 18—18 of Fig. 17.

Fig. 19 is a horizontal sectional view of a spinnerette, the draw plate of which having had the outer circle of projections punched therein, and showing the stamping needle in position for punching the next circle of projections.

Fig. 20 is a vertical cross-section taken on the line 20—20 of Fig. 19 and illustrating the lifting up of the inner portion of the spinnerette draw plate, Fig. 21 is a horizontal sectional view similar to Fig. 19 which illustrates the appearance of the spinnerette draw plate after two circles of projections have been completed and with the stamping needle in position for starting on the third circle, the center lines of the projections still to be stamped are also shown, Fig. 22 is a vertical cross-section taken on the line 22—22 of Fig. 21.

In the drawings in which like numerals of reference indicate like parts, 1 indicates the frame of the stamping machine which comprises a base 2 and an upstanding post member 3 integral therewith.

The post member 3 has an arm 4 which has a split sleeve 5 formed at the outer end thereof. The split sleeve 5 has clamp screws 6 for securing the bearing sleeve 7 in which the spindle 8 which carries the stamping needle 9, slides.

The stamping needle 9 is secured to the spindle 8 by a chuck arrangement 10 such as is commonly used for holding drills, bits, etc.

The spindle 8 is threaded at 11 on its upper end and carries screwed thereon a stop nut 12 and a lock nut 13. The nut 12 rests on a convex surface 14 formed on the upper surface and in the center of the plate 15.

The plate 15 is hingedly connected to a stationary plate 16 mounted on the upper end of the bearing sleeve 7. The hinged means comprises a cylindrical member 17 riveted to the plate 16 upon which rests the groove 18 of the said plate 15. The hinged plate 15 and the stationary plate 16 are bored at 19 and 20 respectively to allow passage therethrough of the spindle 8.

The plate 15, upon which rests the stop nut 12, is hinged for the purpose of lowering and raising the spindle 8 thus allowing the stamping needle 9 to be hammered into the draw plate of the spinnerette 21 by a drop hammer 22.

The distance to which the needle 9 may be dropped when hammered is accurately gauged by a reciprocating tapered wedge member 23 which as it moves to the right as viewed in Fig. 1 allows the hinged plate 15 to lower, thus lowering the spindle 8.

Pivoted at 24 to the post 3 is a forked lever 25 having contact projections 26 which rest on the lock nut 13. A spring 27 is attached at 28 to the lever 25 and has its other end connected at 29 to the arm 4 of the post 3. The lever 25 is thus spring held against the lock nut 13 and eliminates any rebound of the spindle 8 and the stamping needle 9 after the stroke of the hammer 22.

The hammer 22 is operated by lifting it to a certain height and then allowing it to drop on the impact head 30 formed integral with, or attached to, the spindle 8. The hammer 22 is bored at 31 to receive the reduced portion 32 of the spindle 8 and is slidable thereon.

The means for raising the hammer 22 comprise a lever 33 pivoted at 34, intermediate its ends, on the post 3. The lever 33 has a forked end 181 which extends in a chambered opening 182 in the hammer 22. To lift the said hammer 22 the forked end 181 contacts a shoulder 183 when the lever 33 is rocked by the crank drive means. The forked end 22 also surrounds the reduced portion 32 of the spindle 8 which has an abutment nut 184 secured thereon and resting on the said forked end when the lever 33 is rocked sufficiently to raise the spindle 8 completely from within spinnerette 21. The opposite end of the lever 33 is apertured at 35 to receive a connecting rod 36 having a knurled nut 37 mounted thereon to act as an abutment when the said connecting rod is moved downwardly by the crank 38 as it is rotated.

The crank 38 is mounted on a drive shaft 39 driven through the medium of a pulley 40 and a suitable cone clutch connection 41. The belt 42 for driving the pulley 40 may be driven by a suitable source of power (not shown).

The clutch 41 is of the type which is normally spring held in operative driving connection. During the time when it is not desired for the clutch 41 to be in operative engagement means are provided for breaking the driving connection by means of clutch operating lever 43 pivoted in a slot 43a the bracket 44 of which is formed on the post 3.

The lower arm 45 of the said lever 43 is engaged by the hooked end 46 of a lever 47 which is attached at 48 to a latching lever 49 pivoted at 50 to a bracket 51. The latching lever 49 has a detent 52 which engages the detent 53 of a weighted latch 54 when it is desired to release the clutch 41 out of operative connection.

Figure 2:
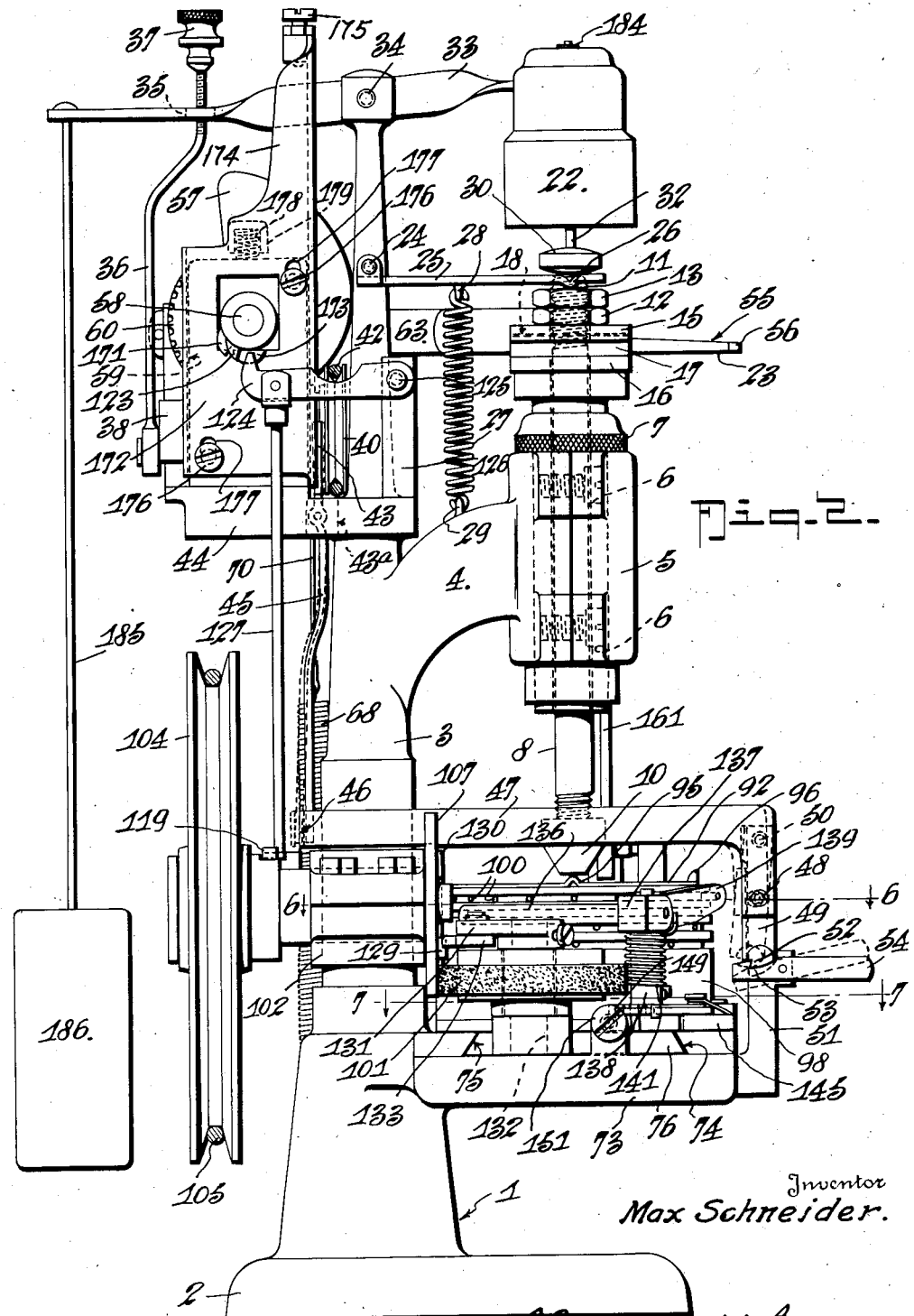
Figure 3:
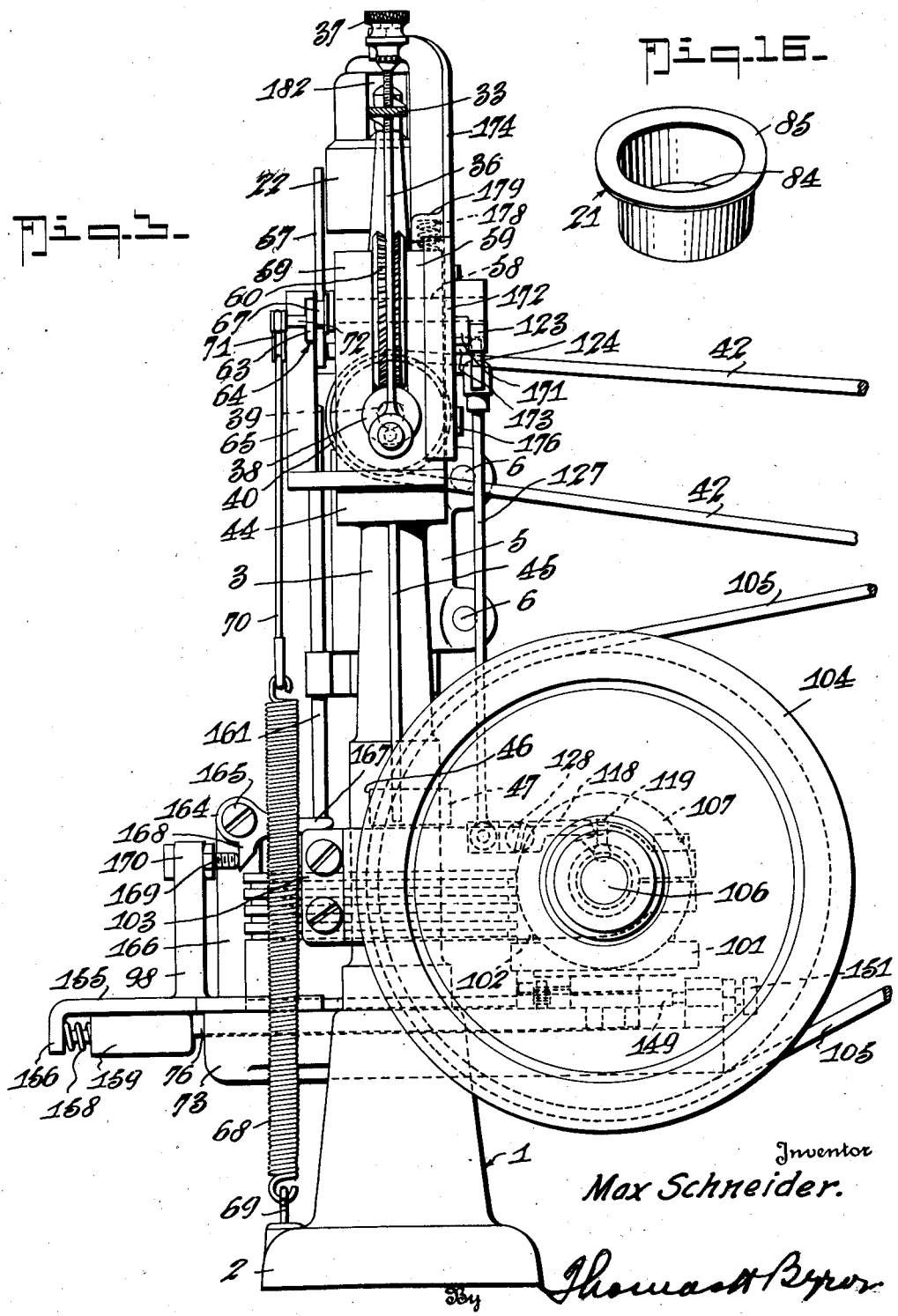

In Fig. 2 of the drawings the dotted line position of the latching mechanism and clutch operating lever illustrates the position of the parts when the clutch 41 is in operative engagement for rotating the crank pin 38 and thereby operating the hammer 22. When the operator desires to stop the operation of the said hammer 22 the latching lever 49 is pushed to the full line position and the weighted latch 54 moves into engagement therewith thus holding the clutch 41 out of engagement.

The hammer lifting lever 33 has attached thereto by any suitable means, such as a cord 185, a weight 186. When the machine is not in use or when a spinnerette is being removed so that another may be placed in position for stamping, the weight 186 is allowed to hang free thus rocking the lever 33 and lifting the spindle 8 and stamping needle 9 clear of the spinnerette. In use this weight is supported by any suitable means and allows the stamping needle 9 to drop in position for stamping.

Synchronized with the operation of the hammer 22 is the reciprocating wedge member 23. It will be noted from an inspection of Fig. 1 of the drawings that this wedge member 23 is shown at the limit of its left hand movement or that position where the hinged plate 15 is raised to its uppermost limit. In this position the stamping needle is just out of contact with the spinnerette draw plate. As the tapered wedge member 23 moves inwardly the hinged plate 15 drops proportionally thus allowing the spindle 8 to be hammered to a lower depth in order to form the projections in the draw plate of the spinnerette 21.

The tapered wedge member 23 comprises a tapered extension 55 which reciprocates between the plates 15 and 16 and thus during each reciprocation thereof lowering and raising the hinged plate 15. At the end of smallest taper is an abutment 56 of which more will be said later. The taper of the said wedge member is so calculated that when the end of largest taper is in engagement with the plate 15 the stamping needle 9 is just out of engagement with the draw plate of the spinnerette 21 and when the end of smallest taper is in engagement therewith the stamping needle 9 penetrates to exactly the desired depth to form the projection required.

The means to reciprocate the wedge member 23 comprise a cam 57 mounted on a shaft 58 which has bearing in a bracket 59 mounted on the post 3. A worm gear 60 is mounted on the said shaft 38 which as pointed out above is driven by a belt 42 and pulley 40 through the medium of the clutch 41.

The wedge member 23 comprises the tapered extension 55 which is attached by a slot and pin connection 62 to a slide member 63 which is slidably mounted in grooves 64 of the bracket uprights 65. A spring 66 is attached at 66a to the tapered portion 55 and has its other end attached to the pin of the pin and slot arrangement 62. The slide member 63 on its inward movement moves a slightly greater distance than the tapered member 55 thus stretching the spring 66 and forcing the abutment 56 always against the stop positioned thereat.

The cam 57 bears against a cam roller 67 mounted on the slide member 63. The roller 67 is spring held against the cam 57 by reason of a spring 68 attached at 69 to the base 2, the other end thereof being connected by a cord or chain 70 which rides over a roller 71 mounted on one of the uprights 65 and is then attached at 72 to the slide 63.

The mechanism above described has to do with the punching of the individual projection to an accurate depth and the raising of the stamping needle to a point just out of contact with the draw plate of the said spinnerette in preparation for the rotation thereof to the desired position of the succeeding one. The means for so doing and the synchronization thereof will now be described.

Extending horizontally from the post 3 and centered below the spindle 8 is shown a bed plate 73 having a dove-tailed groove 74 in which the beveled edges 75 of the work-holder slide 76 have a sliding fit.

Rotatably mounted on the slide 76 by means of a shouldered screw bolt 77 is the circular base plate 78 of the work-holder. The base plate 78 is centrally bored at 79 to receive the bolt 77 and is counter-sunk at 80 to receive the reduced portion 81 of a cylindrical work table 82 upon which a disk 83 of aluminum or other suitable soft metal is placed. Upon this disk 83 rests the draw plate 84 of spinnerette 21. The spinnerette 21 comprises a cylindrical portion 85 which slightly tapers as it approaches the closed end comprising the draw plate 84. At its open end it is formed into an outwardly extending annular flange 85.

The spinnerette 21 is gripped by a circular work-holder 86 which slidably fits over the work table 82 and rests on springs 87 set in depressions 88 of the base plate 78.

A ring 89 is placed over the flange 85, the said ring 89 having an annular depression 90 into which the said flange fits for the positioning thereof. Extending oppositely on two sides of the ring 89 are pins 91. A cover 92 hinged at 93 to a bracket 94 mounted on the base plate 78 has two depressions 95 formed therein which coincide with the pins 91 when the cover 92 is forced down against the upward pressure of the springs 87. A spring latch 96 holds the cover in tight downward position and thereby firmly secures the spinnerette 21 in rigid relationship to the rotatable work table 82.

Attached to the rotatable base plate 78 by screws 97 and adapted to rotate therewith is the control pattern 98 which governs the spacing and number of projections to be formed in the draw plate 84 of the spinnerette 21.

The pattern control 98 comprises a cylinder having circular grooves 99 cut therein. Each groove has cut in the bottom thereof a series of openings 100 in spaced relation. Each groove 99 and the openings 100 therein represents and controls the number of projections to be made in each circle of projections in the spinnerette draw plate 84 as will be more clearly brought out.

The control pattern and work holder are intermittently rotated through the medium of a clutch operated friction wheel 101.

Mounted on a bearing bracket 102 clamped at 103 to the post 3 is a pulley wheel 104 driven by a belt 105 from any suitable source of power (not shown).

The pulley wheel 104 has a clutch connection with a shaft 106 for driving the cam disc 107 which operates the pattern control and work holder for the spinnerette.

Referring specifically to Figs. 9–11 it will be seen that within the bearing bore 108 of the pulley wheel 104 is a clutch ring 109 having semi-circular depressions 110 formed therein.

The shaft 106 has a semi-circular groove 111 cut therein in which is rockably mounted a clutch pin 112. Clutch bearings 113 and 114 are mounted on the shaft 106 and extend within the bearing bore 108 to the ring 109.

The clutch locking pin 112 also has bearing half within the clutch bearings 113 and 114 as shown at 115 and 116 thus locking the shaft 106 and bearings 113 and 114 in positive rotative relationship.

The clutch locking pin 112 has a depression 117 cut therein which when the said pin is in locked position allows the clutch ring 109 of the pulley 104 to rotate freely thereover. When, however, the pin is in operating position as indicated in dotted lines of Figs. 10 and 11 and has been released by the cam operated releasing lever 118 one edge of the depressed portion of the pin 112 extends into the path of the depressions 110 and causes the shaft 106 to be rotated thereby.

The clutch pin 112 has a lateral extension 119 adapted to swing in an arcuate slot 120 cut in the face of the clutch bearing 113 and to extend beyond the periphery of the said bearing and be contacted by a cam operated rocking lever 118. A spring 121 mounted in a recess 122 cut in one face of the slot 120 contacts the extension 119 and on the release thereof by the lever 118 rocks the clutch pin to the locked position for rotating the shaft 106.

The cam operated rocking lever 118 is operated through the medium of a cam 123 mounted on the shaft 58. The cam 123 contacts a lever 124 pivoted at 125 to an upright 126 and is connected by a link 127 to one end of the rocking lever 118. When the cam 123 strikes the lever 124, the said lever is depressed thereby and rocks the lever 118 on its pivot 128 out of the path of the lateral extension 119 which by reason of the spring 121 throws the clutch pin 112 to the locking position with the drive pulley 104 and in driving connection with the shaft 106 which is then rotated thereby.

The cam disc 107 which is intermittently rotated by the shaft 106 has mounted thereon a latch releasing cam 129 and a raised arcuate drive segment 130. The drive segment 130 is so positioned on the disc 107 that just prior to its contacting the friction drive wheel 101 the cam 129 will have released the work-holder pattern and allow rotation thereof.

Figure 5:
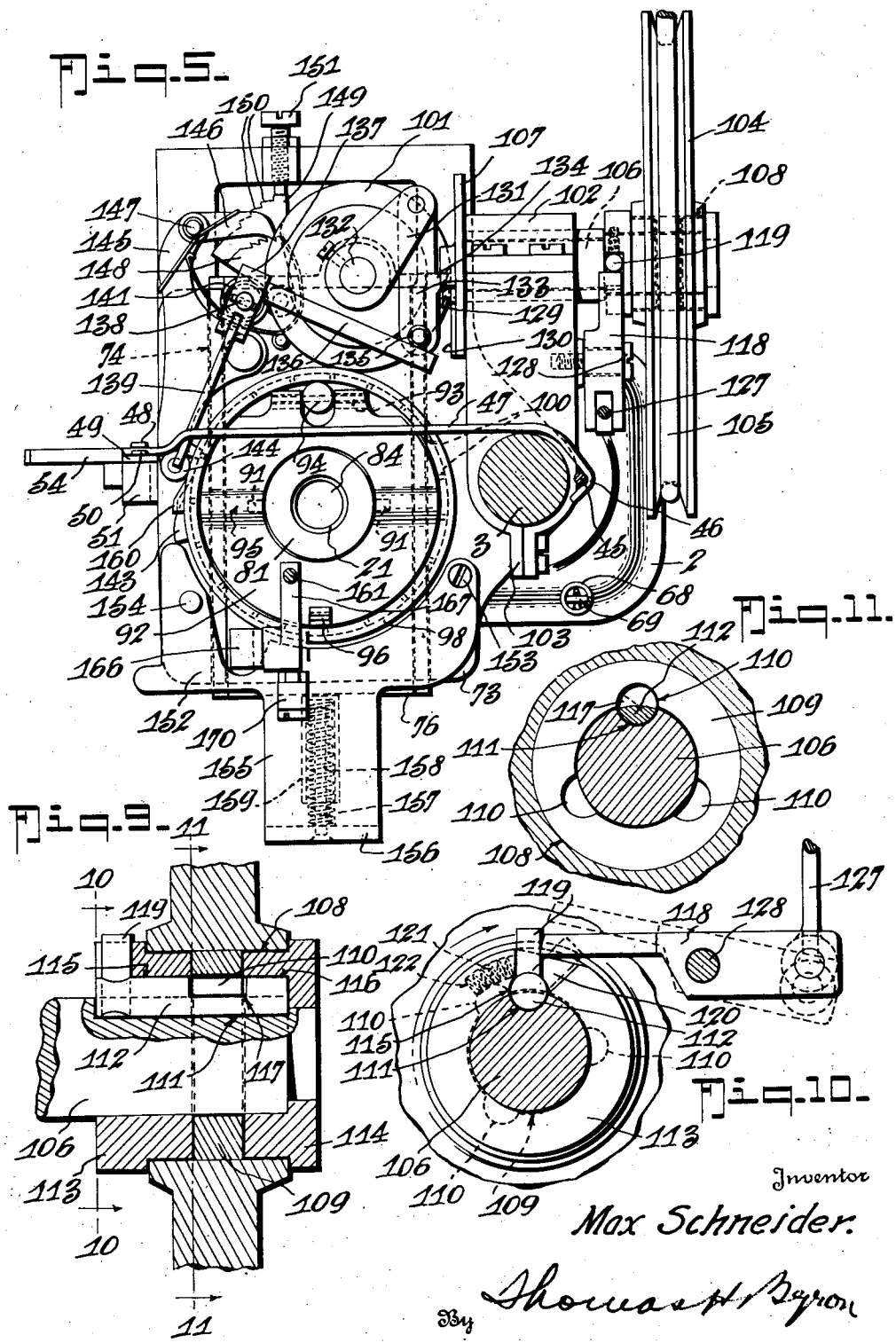
Figures 6, 7:
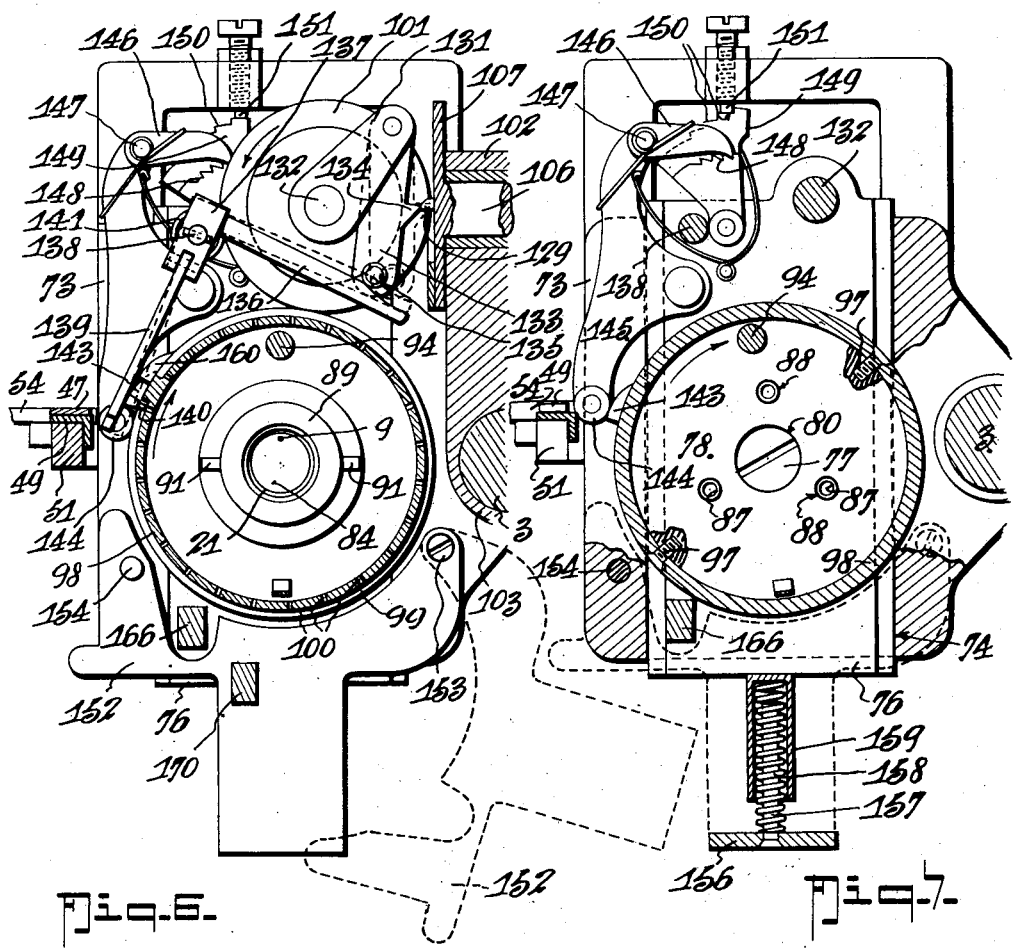
Fig. 7 is a horizontal sectional view taken on the line 7—7 of Fig. 2 with the operating parts shown in the position they assume for allowing the work holder slide to move inwardly whereby projections may be stamped in a circle of smaller radius.
Figure 12:
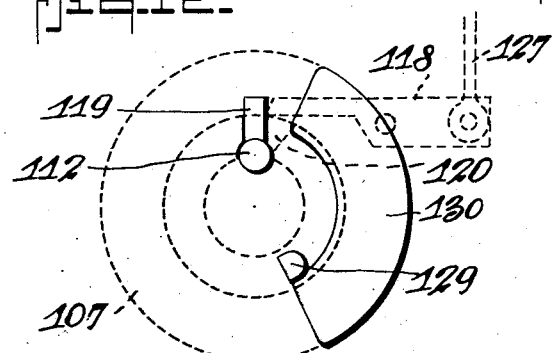
Fig. 12 is a diagrammatic view illustrating the relative position when in inoperative position of the clutch releasing lever, the lug which acts to release the work holder pattern, and the drive track or segment for contacting the work-holder pattern whereby the said pattern may be rotated.
Figure 8:
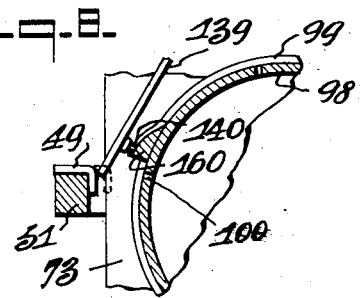
Fig. 8 is a detail section illustrating the manner of latching the clutch releasing mechanism whereby the machine is stopped on the completion of the stamping of the spinnerette.

Referring specifically to Figs. 5 and 6 of the drawings it will be noted that an arm 131 is rigidly mounted on the vertical shaft 132 around which the friction drive wheel 101 rotates. Pivoted to the outer end of this arm 131 is a lever 133 having a projection 134 which extends into the path of the cam 129 and is adapted to be actuated thereby. A contact roller 135 is mounted on the end thereof and bears against the arm 136 mounted in a hinge block 137 pivotally mounted on an upstanding pivot pin 138. The hinge block 137 has the latching lever 139 hingedly mounted therein for up and down movement. The latching lever 139 carries a latch pin 140 at the end thereof which is adapted to ride in the grooves 99 in the pattern control cylinder 98 and extend into the openings 100 for locking the work holder in position during the stamping of a projection in the spinnerette draw plate 84. The latching lever 139 is normally spring held in engagement with the control pattern cylinder 98 by a coil spring 141. Upon contact of the cam 129, however, the lever 133 forces the contact roller 135 against the arm 136 thereby pivoting the latching lever 139 and moving the latch pin 140 carried thereby out of engagement with the particular opening 100 into which it had been projected. The release of the latch pin 140 takes place simultaneously with the rotation of the pattern control cylinder 98 but is only held in this released position momentarily when the said pin 140 then rides in the groove 99 as the next opening 100 revolves into position and is forced therein by the spring 141 acting on the latching lever 139.

This intermittent release and rotation of the pattern control cylinder continues until one circle of projections has been completed. Upon the completion of one circular series of projections it is necessary to move the work holder inwardly to the next stepped position. By reference to Fig. 13 it is seen that each groove 99 dips downwardly at 142 to the groove below. As the pin 140 reaches the dip 142, a cam 143 mounted on the pattern control cylinder 98 contacts the roller 144 of a lever 145 pivoted on the work holder slide 76. The lever 145 carries a pawl 146 pivotally mounted at 147 on the end thereof. The pawl 146 contacts a ratchet 148 of the pivoted abutment member 149. The abutment member has a series of abutment steps 150 which are adapted to contact a stop 151 carried by the bed plate 73. As clearly shown in Fig. 7 when the abutment member is moved the next successive abutment step 150 then contacts the stop 151 and allows inward movement of the work holder slide 76 to bring the spinnerette in position for a second series of stampings in a circle of smaller diameter.

The work holder slide 76 is held tightly against the stop 151 by a pivoted clamp plate 152 which is pivotally mounted at 153 to the bed plate 73 and held in position at its other end by a lock pin 154. The clamp plate 152 has an extension portion 155 with down turned flange 156 having riveted thereto a centering pin 157 for a coil spring 158. A cylinder 159 closed at one end is placed thereover and, when the clamp plate 152 is in locked position, is pressed strongly against the work holder slide 76 thereby forcing the said slide against the stop 151.

When the stamping of the spinnerette has been completed, and in order to automatically stop the stamping thereof, the latching lever 139 rides against a grooved cam 160 which is positioned at the end of the lowermost of the grooves 99 and is forced into contact with the latching lever 49 which swings on its pivot 50 until it is engaged by the weighted latch 54 which throws the clutch 41 out of engagement and stops the machine.

During the stamping of the spinnerette draw plate 84, due to the stress on the metal and the projections which are stamped against the soft metal plate 83, the center of the draw plate is lifted more than the outside and this lift is approximately directly proportional to the distance inward from outside to inside. This is clearly brought out in Figures 17–22 of the drawings.

In Fig. 18, before the stamping operation has started the spinnerette, draw plate 84 lies flat on the soft metal plate 83. In Fig. 20 the draw plate 84 has bulged upwardly in the center and in Fig. 22 after two series of projections have been stamped the bulge in the center has become slightly higher. In view of the difficulty it is readily apparent that it is necessary in order to obtain projections of uniform depth, to compensate for this difference in level between the center of the draw plate 84 and the outside thereof. Therefore the stamping needle 9 must not be allowed to drop as far for the projections in the center as for those which were made on the outer surface.

The means which compensate for buckling upward of the center of the draw plate 84 are operated by the movement inwardly of the work holder slide. The means for accomplishing this result comprise a rod 161 vertically mounted on the sleeve 5 and having a tapered surface extension 162 which projects through a slot 163 in a bracket extension of the stationary plate 16. This tapered extension 162 acts as an abutment for the projection 56 of the tapered wedge member 23 and acts to govern the depth to which the stamping needle may descend.

It will be recalled that the wedge member 23, as it is reciprocated, raises and lowers the hinged plate 15 which supports the stamping needle spindle and thereby raises and lowers the said stamping needle 9. The tapered extension 162, which acts as an abutment for this wedge member 23, controls the distance which the said wedge member may move inwardly thus controlling the distance to which the hinged plate 15 may be lowered.

While the outer circle of projections is being stamped the rod 161 is at its uppermost position and the smallest part of the tapered extension 162 is contacted by the abutment 56 of the wedge 23, allowing the spindle 8 to drop to its lowest point. As the work holder slide moves inwardly and the surface of the spinnerette draw plate is at a proportionately higher level, as hereinbefore explained, the rod 161 drops and the tapered extension 162 presents an increasingly wider surface. As the abutting surface becomes wider the wedge 23 cannot move as far inwardly and thus the hinged plate 15 cannot drop as far with the result that the stamping needle 9 drops to a lesser degree.

The rod 161 moves downwardly a step at a time at the end of each complete revolution of the work-holder and the stepping inward thereof by means of a bell crank 164 which is pivoted at 165 to a bearing upright 166 mounted on the workholder slide 76.

Figure 4:
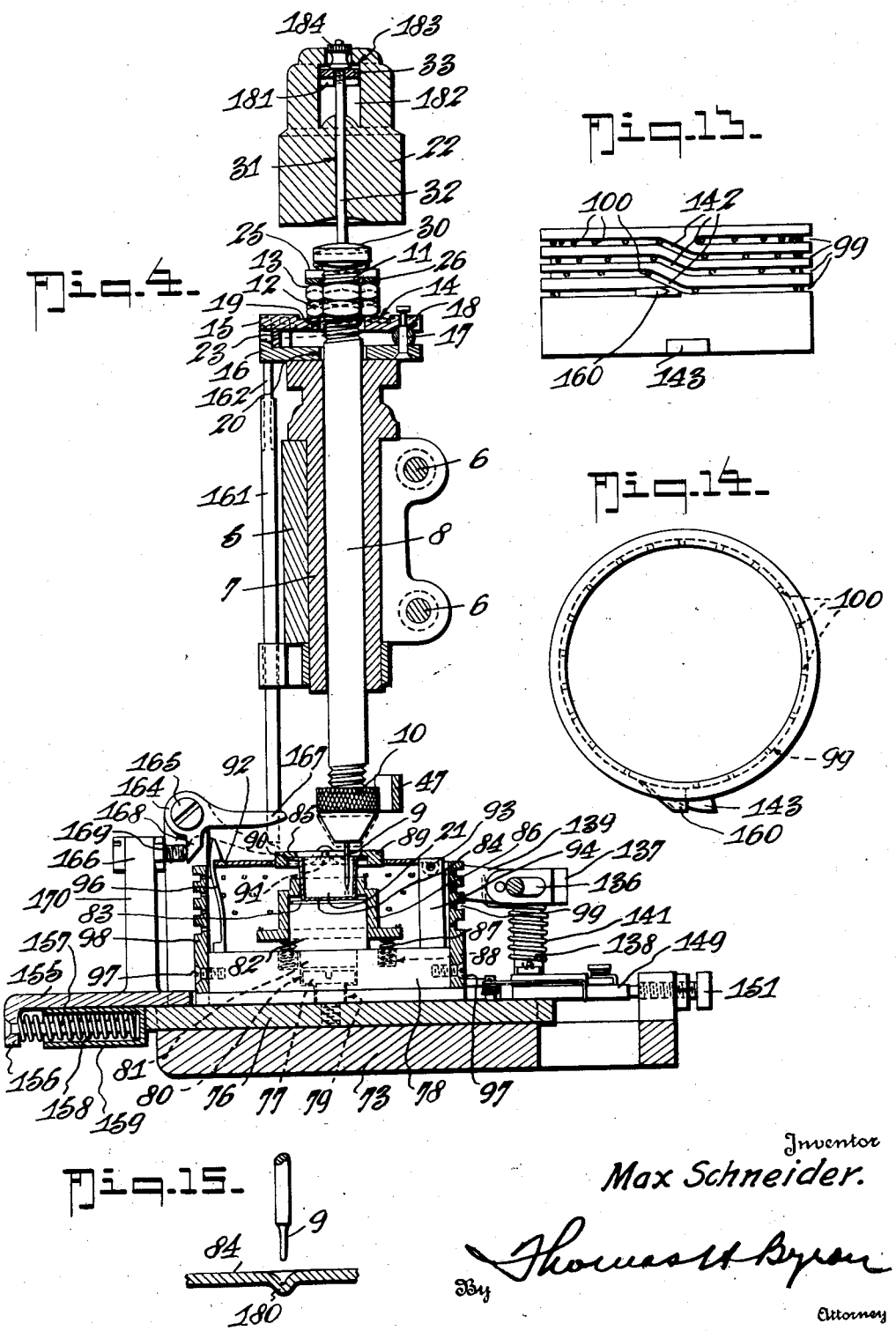

The rod 161 rests on an arm 167 of the bell crank 164 while the other arm 168 of the said bell crank abuts against an adjustable screw stop 169 mounted on a post 170 which is integrally attached to the clamp-plate 152. As the workholder slide 76, after each revolution of the pattern control 98, moves inwardly the arm 167 is lowered as shown in dotted lines in Fig. 4, thus lowering the rod 161 and preventing the wedge member 23 from moving as far inwardly thus also preventing the hinge plate 15 from dropping to as low a plane with a consequent lesser drop of the stamping needle 9 and so compensating for the convexity of the spinnerette draw plate 84.

Mounted on the shaft 58 adjacent the clutch releasing cam 123 and positioned to operate just prior to the said cam 123 is another cam 171 which acts to depress a spring lifted slide 172 when it contacts a surface 173 on the said slide. Carried on an upwardly extending arm 174 of the said slide 172 is an abutment screw 175, the purpose of which is to contact the hammer lifting lever 33 and stop its vibration while lifting the stamping needle 9 out of engagement with the draw plate 84 of the spinnerette 21. The slide 172 is slidably attached to the bracket 59 by means of shouldered screw bolts 176 which extend through slots 177 in the said slide 172. A spring 178 is socketed in a recessed enlargement 179 attached to the rear of the slide 172 and bears against the top surface of the bearing bracket 59 to normally hold the abutment screw 175 out of engagement with the hammer lifting lever 33. By depressing the hammer lifting lever 33 and raising the hammer 22 and the stamping needle 9 out of engagement with the draw plate 84 of the spinnerette any tendency of the stamping needle to vibrate and scratch or mar the surface of the projection just made is eliminated.

In Fig. 15 of the drawings is shown, greatly enlarged, a portion of the spinnerette draw plate 84 with one of the projections 180 formed therein and the stamping needle 9 withdrawn therefrom and in the position the said needle 9 takes when the slide 172 lifts it out of engagement with the draw plate 84 prior to the turning of the spinnerette to the position of the next projection to be made.

Operation

The operation of the stamping machine is as follows: The spinnerette cup blank is positioned in the work holder and securely clamped thereon. The work holder slide 76 is slid into place in the bed plate 73 with the abutment step 150 of greatest radius from the pivot point of the abutment lever tightly held against the stop screw 151 as shown in Fig. 5 of the drawings. In this position the stamping needle 9 is nearest the outer periphery of the draw plate 84 of the spinnerette and in position to stamp the outer circle of projections 180 as the work holder is intermittently revolved.

The weight 186, which has been hanging free and causing the hammer lifting lever 33 to hold the spindle 8 and stamping needle 9 above the spinnerette cup 21 and out of engagement with the draw plate 84, is lifted by the operator and placed on any suitable support. This allows the spindle 8 to drop until the stop nut 12 is resting on the hinged plate 15, and the drop hammer resting on the impact head 30 as shown in dotted lines in Fig. 1.

The two pulleys 40 and 104, which are driven from any suitable source of power (not shown) by belts 42 and 105, respectively, are rotating freely on their respective shafts 39 and 106.

The operator then lifts the weighted lever 54 and thereby releases the latching lever 49 and the connecting lever 47 which has been holding the spring held cone clutch 41 out of driving engagement with the shaft 39. The shaft 39 then begins rotating and through the medium of the crank pin 38 and connecting rod 36 rapidly rocks the hammer lifting lever 33, the hammer dropping a plurality of times on the impact head 30 and driving the spindle 8 and stamping needle 9 downwardly as the hinged plate 15 lowers by reason of the inward movement of the wedge member 23. The cam 57 which operates the wedge member 23 is designed to draw the wedge member 23 inwardly at a comparatively slow rate so that the hinged plate is lowered during a plurality of impacts from the hammer. The wedge member 23, however, on its return movement, whereby it raises the hinged plate 15 and also the stamping needle 9, moves quite rapidly due to the design of the cam 57.

At the start of this lifting of the stamping needle 9 out of engagement with the spinnerette draw plate 84 the cam 171 contacts with the cam surface 173 of the slide 172 thereby depressing it and causing the abutment screw 175 to contact with the hammer lifting lever 33 and rapidly raise the said hammer out of contact with the impact head 30 and stop any side vibration of the stamping needle 9 which may take place and damage the side walls of the projection which has just been stamped.

During the time the hammer 22 is raised and at that point where the wedge member 23 has returned to raise the plate 15 and the stamping needle 9 out of contact with the draw plate 84 of the spinnerette the cam 123 depresses the pivoted lever 124 and the connecting rod 127 to rock the clutch releasing lever out of the path of the lateral extension 119 which is integral with the clutch pin 112. The clutch pin 112 by reason of the spring 121 is rocked and projects into the path of one of the cut-out depressions 110 thereby throwing the drive pulley 104 into engagement with the cam disc drive shaft 106 to drive the cam driving disc 107.

Upon rotation of the cam drive disc 107 the latch releasing cam 129 throws the pivoted lever 133 and its contact roller 135 over against the latch operating arm 136 and causes the latch pin 140 carried by the latching lever 139 to withdraw from the particular opening 100 with which it was in engagement and thus allow the work holder to be rotated by the friction disc 101 which is being simultaneously rotated by contact with the driving segment 130 mounted on the cam drive disc 107.

The latching lever 139 rides in the groove 99 until the pattern control has revolved sufficiently for the next successive hole 100 of the pattern control 98 to come within reach of the latch pin 140 which thereupon drops in and locks the work holder in position for the next projection 180 to be stamped.

The drive shaft 106 only completes one revolution when the clutch is again disengaged by the clutch releasing lever 118 projecting in the path of the lateral extension 119 and thereby rocking the clutch pin 112 out of engagement with the drive pulley 104.

The above operations are repeated as many times as there are openings in the first groove 99 and until the cam 143 mounted on the pattern control 98 actuates the abutment operating lever 145 whereupon the abutment member is moved sufficiently for the next successive step 150 to come in contact with the stop screw 151 and allow the slide 76 to move in a sufficient distance for the next circle of projections 180 within the finished outer circle of projections.

The stamping machine continues to operate until the latching pin 146 rides up on the stopping cam 160 and forces the latching lever 49 over into engagement with the latch 54 thus disengaging the cone clutch 43.

With the stamping machine above described hollow projections of unusual accuracy and uniformity may be stamped in the draw plates of the spinnerettes. Whenever spinnerettes having different numbers of holes are required it is only necessary to change the pattern control cylinder and put in place thereof one having the required number of openings and grooves thus governing the spacing and design thereof.

In the drawings the pattern control cylinder 98 illustrated is suitable for the stamping of spinnerettes having 60 holes. The upper groove has 24 holes 100 for stamping 24 projections in the outer circle, the next groove has 18 holes 100 for the next circle, the third groove has 12 for the third circle of projections and the lowest groove has 6 holes so that 6 projections may be punched in the innermost or smallest circle. More grooves may be cut in the pattern control cylinder, or more holes to a groove, or the combination of each may both be changed to vary the number and position of the openings 100 to suit the requirements desired.

From the foregoing description, taken in connection with the accompanying drawings, it is thought the complete construction, operation, and advantages of this invention will be clear to those skilled in the art to which it relates.

It is of course to be understood that the form of the invention, herewith shown and described, is to be taken as a preferred example of the same and that various changes in the shape, size and arrangement of parts may be resorted to, without departing from the spirit of my invention, or the scope of the subjoined claims.

Having thus described my invention as prescribed by the patent statutes, what I claim is:

1. A stamping machine comprising, in combination, a stamping element or the like and operating means therefor, a slide, a rotatable work holder mounted on said slide, means to intermittently rotate said work holder, and automatic means adapted at the completion of each revolution of said work holder to advance said slide and work-holder inwardly.

2. A stamping machine comprising, in combination, a stamping element or the like and operating means therefor, a slide, a rotatable work holder mounted on said slide, means to intermittently rotate said work holder, said means comprising a roller mounted on said slide and in contact with said work holder, a disc to drive said roller, clutch operated means to drive said disc intermittently, and means to move said slide and work holder inwardly a step at a time at predetermined intervals.

3. A stamping machine comprising, in combination, a stamping element or the like and operating means therefor, a slide, a rotatable workholder mounted on said slide, means to intermittently rotate said work-holder, a pattern control cylinder mounted on said work-holder and rotatable therewith, means cooperating with said control cylinder to hold said work-holder in fixed relation to the stroke of the stamping element during the stamping operation, and means to move said slide and work-holder inwardly a step at a time at predetermined intervals.

4. A stamping machine comprising, in combination, a stamping element and operating means therefor, a work-holder slide, a rotatable work-holder carried thereon, a pattern control cylinder mounted on said work-holder and rotatable therewith, means to intermittently rotate said work-holder and control cylinder, said means comprising a driving wheel mounted on said slide and in contact with said work-holder, a clutch-operated drive for said driving wheel, and means to move said slide and work-holder inwardly a step at a time at predetermined intervals.

5. A stamping machine comprising, in combination, a stamping element and operating means therefor, a work-holder slide, a rotatable work-holder carried thereon, a pattern control cylinder mounted on said work-holder and rotatable therewith, means cooperating with said control cylinder to hold said work-holder during the stamping operation, means to intermittently rotate said work-holder and control cylinder, said means comprising a roller mounted on said slide and in driving contact with said control cylinder, a clutch-operated driving disc, a driving segment mounted on said disc and adapted on rotation thereof to drive said control cylinder, and a cam mounted on said disc and adapted to actuate the means holding said work-holder just prior to rotation of said driving disc.

6. A stamping machine comprising, in combination, a stamping spindle and stamping element attached thereto, means to drive said spindle downwardly, and means in operative relation with said spindle for regulating the depth to which said spindle may be driven, said last mentioned means comprising a movable surface by which said spindle is supported, and a movable wedge member operating in timed relation with said spindle driving means to raise and lower said movable surface.

7. A stamping machine comprising, in combination, a stamping spindle and stamping element attached thereto, means to drive said spindle downwardly, and means in operative relation with said spindle for regulating the depth to which said spindle may be driven, said last mentioned means comprising a movable surface supporting said spindle, and a reciprocating wedge member operating in timed relation with said spindle driving means to raise and lower said movable surface whereby the said stamping element is alternately lowered to the exact depth for the stamping operation then raised out of engagement with the stamped surface.

8. A stamping machine comprising, in combination, a stamping spindle and stamping element carried thereby, means to drive said spindle downwardly comprising a reciprocated hammer, means to lift said hammer for dropping it on said spindle, and means in operative relation with said spindle for regulating the depth to which said spindle may be driven, said last mentioned means operated in timed relation with said spindle driving means.

9. A stampng machine comprising, in combination, a stamping spindle and stamping element carried thereby, means to drive said spindle downwardly comprising a reciprocated hammer, means to lift said hammer for dropping it on said spindle, and means in operative relation with said spindle for regulating the depth to which said spindle may be driven, said last mentioned means comprising a movable surface supporting said spindle, and a reciprocating wedge member operating in timed relation with said spindle driving means to raise and lower said movable surface whereby the said stamping element is alternately lowered to the exact depth for the stamping operation and then raised out of engagement with the stamped surface, and means operatively timed to raise simultaneously said hammer out of contact with said spindle as said wedge member starts to raise said movable surface.

10. A stamping machine comprising, in combination, a stamping spindle and stamping element carried thereby, means to drive said spindle downwardly, means in operative relation with said spindle for lowering and raising said spindle into and out of engagement with the surface being stamped, and means operatively timed to simultaneously raise said spindle driving means out of contact with said spindle as said spindle is moved out of engagement with the stamped surface.

11. A stamping machine comprising, in combination, a stamping spindle and stamping element carried thereby, means to drive said spindle downwardly, means in operative relation with said spindle for lowering and raising said spindle into and out of engagement with the surface being stamped, a slide, a rotatable work holder mounted on said slide and positioned beneath said spindle, means to intermittently rotate said work holder, said last mentioned means rotating said work holder as said spindle reaches the highest point of its upward movement.

12. A stamping machine comprising, in combination, a stamping spindle and stamping element carried thereby, means to drive said spindle downwardly, means in operative relation with said spindle for lowering and raising said spindle into and out of engagement with the surface being stamped, a slide, a rotatable work holder mounted on said slide and positioned beneath said spindle, means to intermittently rotate said work holder in timed relation to the lowering and raising of the spindle, means to move said slide and work-holder inwardly at predetermined intervals, and means actuated by the movement of said slide inwardly to vary the depth to which said spindle is lowered.

13. A stamping machine comprising, in combination, a stamping spindle and stamping element carried thereby, means to drive said spindle downwardly, means in operative relation with said spindle for lowering and raising said spindle into and out of engagement with the surface being stamped, a slide, a rotatable work holder mounted on said slide and positioned beneath said spindle, means to intermittently rotate said work holder in timed relation to the lowering and raising of the spindle, means to move said slide and work-holder inwardly at predetermined intervals, and means to decrease the depth to which said spindle may drop actuated by the inward movement of said slide.

14. A stamping machine comprising in combination, a stamping spindle and stamping element carried thereby, means to drive said spindle downwardly, means to lower and raise said spindle into and out of engagement with the surface to be stamped, said last mentioned means comprising a movable surface by which said spindle is supported, a reciprocating wedge member in engagement with said surface and acting to lower and raise the said surface, a slide, a rotatable work holder mounted on said slide and positioned beneath said spindle, means to move said slide inwardly a step at a time at predetermined intervals, and means actuated by the inward movement of said slide to vary the depth to which said spindle may be lowered, said last mentioned means comprising a tapered surface against which the said wedge member abuts at the end of its movement in one direction.

15. A stamping machine comprising, in combination, a stamping spindle and stamping element carried thereby, means to drive said spindle downwardly, means to lower and raise said spindle into and out of engagement with the surface to be stamped, said last mentioned means comprising a movable surface by which said spindle is supported, a reciprocating wedge member in engagement with said surface and acting to lower and raise the said surface, a slide, a rotatable work holder mounted on said slide and positioned beneath said spindle, means to move said slide inwardly a step at a time at predetermined intervals, and means actuated by the inward movement of said slide to vary the depth to which said spindle may be lowered, said last mentioned means comprising a movable tapered surface against which the said wedge member abuts at the end of its movement in one direction.

16. A stamping machine comprising, in combination, a stamping spindle and stamping element carried thereby, means to drive said spindle downwardly, means to lower and raise said spindle into and out of engagement with the surface to be stamped, said last mentioned means comprising a movable surface on which said spindle is supported, a reciprocating wedge element in engagement with said surface and acting to lower and raise the said surface, a slide, a rotatable work holder mounted on said slide and positioned beneath said spindle, means to move said slide inwardly a step at a time at predetermined intervals, and means actuated by the inward movement of said slide to vary the depth to which said spindle may be lowered, said last mentioned means comprising a movable element having formed at one end thereof a tapered surface against which the said wedge member abuts at the end of its movement in one direction, a bell crank, said movable element resting on one arm of said crank, the said bell crank being pivotally mounted and having its other arm in engagement with an abutment mounted on said slide and actuated thereby.

17. A stamping machine comprising, in combination, a stamping element and operating means therefor, a work holder slide, a rotatable work holder carried thereon, a pattern control cylinder mounted on said work holder and rotatable therewith, a groove cut in said cylinder, a series of spaced openings formed in the bottom of said grooves, a latching lever having a pin mounted on one end thereof and riding in said groove, said pin adapted to fit in said openings and hold said work-holder rigidly in position, means to intermittently release said latching means and rotate said control cylinder and work holder, said last mentioned means comprising a driving wheel mounted on said slide and in contact with said control cylinder, a clutch-operated driving disc, a driving segment mounted on said disc and adapted on rotation thereof to drive said control cylinder, and a cam mounted on said disc positioned to actuate the said latching lever to release the said cylinder for rotation just prior to the contacting of the said driving segment with the driving wheel.

18. A stamping machine comprising, in combination, a stamping spindle and stamping element carried thereby, means to drive said spindle downwardly, means in operative relation with said spindle for lowering and raising said spindle into and out of engagement with the surface being stamped, means to lift simultaneously said spindle driving means out of contact with said spindle as the spindle starts to rise out of engagement with the stamped surface, a slide, a rotatable work-holder mounted on said slide and positioned beneath said spindle, means to intermittently rotate said work-holder in timed relation to the lowering and raising of the spindle, means to move said slide and work holder inwardly at predetermined intervals, and means actuated by the movement of the said slide to vary the depth to which the said spindle may be lowered.

19. A stamping machine comprising, in combination, a stamping spindle and stamping element carried thereby, means to drive said spindle downwardly, means in operative relation with said spindle for lowering and raising said spindle into and out of engagement with the surface being stamped, a slide, a rotatable work holder mounted on said slide and positioned beneath said spindle, means to intermittently rotate said work holder in timed relation to the lowering and raising of the spindle, means to move said slide and work holder inwardly at predetermined intervals, and means to decrease the depth to which said spindle may drop actuated by the inward movement of the slide.

20. A stamping machine comprising, in combination, a stamping spindle and stamping element carried thereby, means to drive said spindle downwardly, means in operative relation with said spindle for lowering and raising said spindle into and out of engagement with the surface being stamped, means to lift simultaneously said spindle driving means out of contact with said spindle as the spindle starts to rise out of engagement with the stamped surface, a slide, a rotatable work-holder mounted on said slide and positioned beneath said spindle, means to intermittently rotate said work-holder in timed relation to the lowering and raising of the spindle, means to move said slide and work-holder inwardly at predetermined intervals, means actuated by the inward movement of the said slide to vary the depth to which the said spindle may be lowered, and means operated by said work-holder to stop the machine at the end of the stamping operation.

21. A stamping machine comprising, in combination, a stamping spindle and stamping element carried thereby, means to drive said spindle downwardly, means in operative relation with said spindle for lowering and raising said spindle into and out of engagement with the surface being stamped, means to lift simultaneously said spindle driving means out of contact with said spindle as the spindle starts to rise out of engagement with the stamped surface, a slide, a rotatable work-holder mounted on said slide and positioned beneath said spindle, means to intermittently rotate said work-holder in timed relation to the lowering and raising of the spindle, means to move said slide and work-holder inwardly at predetermined intervals, means actuated by the inward movement of the said slide to vary the depth to which the said spindle may be lowered, and means to stop said machine at the end of the stamping operation comprising a cam mounted on said work-holder, and stopping means actuated thereby.

22. A stamping machine comprising, in combination, a stamping element or the like and operating means therefor, a slide, a rotatable work-holder mounted on said slide, means to rotate said work-holder, means to progressively change the relative position of said stamping element and work-holder, and means synchronized with said changing means to vary the stamping position of said stamping element with respect to said work-holder.

23. A stamping machine comprising, in combination, a stamping element or the like, a slide, a rotatable work-holder mounted on said slide, means to intermittently rotate said work-holder, a pattern control cylinder mounted on said work-holder and rotatable therewith, means cooperating with said control cylinder to hold said work-holder in fixed relation to the stroke of the stamping element during the stamping operation, and automatic means adapted to change the relative position of said stamping element and work-holder at predetermined intervals.

24. A stamping machine comprising, in combination, a stamping element or the like, a slide, a rotatable work-holder mounted on said slide, means to progressively rotate said work-holder, a pattern control cylinder mounted on said work-holder and rotatable therewith, means cooperating with said control cylinder to hold said work-holder in fixed relation to the stroke of the stamping element during the stamping operation, and automatic means adapted to change the relative position of said stamping element and work-holder at pre-determined intervals.

25. A stamping machine, comprising, in combination, a stamping spindle and stamping element carried thereby, means to drive said spindle downwardly comprising a reciprocated hammer, means in operative relation with said spindle for lowering and raising said stamping element into and out of engagement with the surface stamped, and means operatively timed to raise simultaneously said hammer out of engagement with said spindle as said spindle starts to raise from the stamped surface.

26. A stamping machine comprising, in combination, a stamping element, means to drive said stamping element comprising a reciprocated hammer, a rotatable work-holder in operative relation to said stamping element, means to intermittently rotate said work-holder, means to lower and raise said stamping element into and out of contact with the surface to be stamped, means to rotate said work-holder as the said stamping element is raised from the stamped surface, means to hold said work-holder in positive stationary position as said stamping element is driven into the surface to be stamped, means to raise said hammer out of contact with said stamping element as the said stamping element starts to rise out of engagement with the stamped surface, means to change the relative position of said stamping element and work-holder at predetermined intervals, means operated by the change in relative position of said work-holder and stamping element to regulate the depth to which said stamping element may operate, and means to automatically stop the machine at the end of the stamping operation.

27. A stamping machine comprising, in combination, a stamping element, means to drive stamping element comprising a reciprocated hammer, a slide, a rotatable work-holder mounted on said slide and operatively positioned with respect to said stamping element, a pattern control cylinder mounted on said work-holder and rotatable therewith, means to intermittently rotate said work-holder and control cylinder, means to lower and raise said stamping element into and out of contact with the surface to be stamped, means cooperating with said control cylinder to hold said work-holder in positive non-rotative position as said stamping element is lowered into contact with the surface to be stamped, means operatively timed to move said hammer out of contact with said stamping as said stamping element starts to rise from said stamped surface, means operated by said control cylinder to change the relative position of said stamping element and work-holder at predetermined intervals, and means operatively timed to change the depth to which the stamping element may operate during the change in relative position of the said stamping element and work-holder.

28. A stamping machine comprising, in combination, a stamping element and operating means therefor, a rotatable work-holder operatively positioned with respect to said stamping element, means to intermittently rotate said work-holder, means to hold said work-holder in positive non-rotative position during the period in which the stamping element contacts the surface being stamped, and means to automatically control the depth to which said stamping element operates.

29. A stamping machine comprising, in combination, a stamping element and operating means therefor, a rotatable work-holder operatively positioned with respect to said stamping element, a pattern control cylinder mounted on said work-holder and rotatable therewith, means to intermittently rotate said work-holder, and pattern control cylinder, means cooperating with said control cylinder to hold said work-holder in positive non-rotative position during the period in which the stamping element contacts the stamped surface, and means to automatically control the depth to which said stamping element operates.

30. A stamping machine comprising, in combination, a reciprocated stamping element and operating means therefor, a rotatable work-holder operatively positioned with respect to said stamping element, a control cylinder mounted on said work-holder and rotatable therewith, means to intermittently rotate said work-holder and control cylinder, means cooperating with said control cylinder to hold said work-holder in positive non-rotative position during the period in which the stamping element contacts the surface to be stamped, means operated by and timed with said rotating means to release said holding means and means operated by said control cylinder to stop the machine at the end of the stamping operation.

31. A stamping machine comprising, in combination, a stamping element and operating means therefor, a rotatable work-holder operatively positioned with respect to said stamping element, a control element operating in conjunction with said work-holder, means to intermittently rotate said work-holder, means cooperating with said control element to hold such work-holder in positive non-rotative position during the period in which the stamping element contacts the surface to be stamped, and means operated by and timed with said rotating means to release said holding means.

32. A stamping machine comprising, in combination, a reciprocated stamping element and operating means therefor, a rotatable work-holder, means to progressively rotate said work-holder, and means controlled and operated solely by said machine to control the depth to which the stamping element may operate.

33. A stamping machine comprising, in combination, a reciprocated stamping element and operating means therefor, a rotatable work-holder in operative relation to the said stamping element, a pattern control element operating in conjunction with said work-holder, means to rotate said work-holder in timed relation with said stamping element, and means controlled and operated solely by the said machine to vary the depth to which the stamping element may operate.

34. A stamping machine comprising, in combination, a stamping element and operating means therefor, a rotatable work-holder, means to progressively rotate said work-holder in timed relation to the operation of the stamping element, automatic means to change the relative position of said stamping element and work-holder at predetermined intervals, and means operated during the change in relative position of the stamping element and work-holder to vary the stamping action of the said stamping element.

35. A stamping machine comprising, in combination, a stamping element, a rotatable work-holder in operative relation to said stamping element, means to progressively rotate said work-holder, means to hold said work-holder in positive engagement during stamping operation, means to lower and raise said stamping element into and out of engagement with the surface being stamped, means for producing a stamping movement of said stamping element after being moved into engagement with the surface being stamped, means to move last named means out of engagement with said stamping element as the said stamping element starts to rise from the stamped surface, automatic means to change the relative position of said stamping element and work-holder at predetermined intervals, means operated by the change in relative position of said stamping element and work-holder to regulate the depth to which said stamping element may operate, and means to automatically stop the machine at the end of the stamping operation.

36. A stamping machine comprising, in combination, a stamping element, a rotatable work-holder in operative relation to said stamping element, means to progressively rotate said work-holder, means to hold said work-holder in positive engagement during stamping operation, means to lower and raise said stamping element into and out of engagement with the surface being stamped, means for producing a stamping movement of said stamping element after being moved into engagement with the surface being stamped, means to move said last named means out of engagement with said stamping element as the said stamping element starts to rise from said stamped surface, automatic means to change the relative position of said stamping element and work-holder at predetermined intervals, means operatively timed to change the depth to which the stamping element may operate during the change in relative position of said stamping element and work-holder, and means to automatically stop the machine at the end of the stamping operation.

37. A stamping machine comprising, in combination, a stamping element, a rotatable work-holder in operative relation to said stamping element, means to progressively rotate said work-holder, means to hold said work-holder in positive engagement during stamping operation, means to lower and raise said stamping element into and out of engagement with the surface being stamped, means for producing a stamping movement of said stamping element after being moved into engagement with the surface being stamped, means to move said last named means out of engagement with said stamping element as the said stamping element starts to rise from the stamped surface, means to change the relative position of said work-holder and stamping element at predetermined intervals, and means operatively timed to change the depth to which the stamping element may operate during the change in relative position of the said stamping element and work-holder.

38. A stamping machine comprising, in combination, a stamping element, a rotatable work-holder in operative relation to said stamping element, means to progressively rotate said work-holder, means to lower and raise said stamping element into and out of engagement with the surface being stamped, means to hold said work-holder in positive non-rotative position while said stamping element is in contact with the stamped surface, means for producing a stamping movement of said stamping element on being moved into engagement with the surface being stamped, and means to move said last named means out of engagement with said stamping element as the said stamping element starts to rise from the stamped surface.

39. A stamping machine comprising, in combination, a stamping element, a rotatable work-holder in operative relation to said stamping element, means to progressively rotate said work-holder, means to lower and raise said stamping element into and out of engagement with the surface being stamped, means to hold said work-holder in positive non-rotative position while said stamping element is in contact with the stamped surface, means for producing a stamping movement of said stamping element on being moved into engagement with the surface being stamped, means to move said last named means out of engagement with said stamping element as the said stamping element starts to rise from the stamped surface, and means to automatically stop the machine at the end of the stamping operation.

40. A stamping machine comprising, in combination, a stamping element, a work-holder operatively positioned with respect to said stamping element, means to lower and raise said stamping element into and out of engagement with the surface being stamped, means in intermittently rotate said work-holder in timed relation to the lowering and raising of the said stamping element, means for producing a stamping movement of said stamping element on being moved into engagement with the surface being stamped, means to move said last named means out of engagement with said stamping element as the said stamping element starts to rise from the stamped surface, automatic means to change the relative position of said stamping element and work-holder at predetermined intervals and means operated by the change in relative position of said stamping element and work-holder to regulate the depth to which said stamping element may operate.

41. A stamping machine comprising, in combination, a stamping element, a work-holder operatively positioned with respect to said stamping element, a control element operated in conjunction with said work-holder, means to lower and raise said stamping element into and out of engagement with the surface being stamped, means to intermittently rotate said work-holder in timed relation to the lowering and raising of the said stamping element, means for producing a stamping movement of said stamping element on being moved into engagement with the surface being stamped, means to move said last named means out of engagement with said stamping element as the said stamping element starts to rise from the stamped surface, means operated by said control element to change the relative position of said stamping element and work-holder at predetermined intervals, and means operated by the change in relative position of the stamping element and work-holder to regulate the depth to which said stamping element may operate.

42. A stamping machine comprising, in combination, a stamping element, a work-holder operatively positioned with respect to said stamping element, means to lower and raise said stamping element into and out of engagement with the surface being stamped, means to intermittently rotate said work-holder in timed relation to the lowering and raising of the said stamping element, means for producing a stamping movement of said stamping element on being moved into engagement with the surface being stamped, means to move said last named means out of engagement with said stamping element as the said stamping element starts to rise from the stamped surface, automatic means to change the relative position of said stamping element and work-holder at predetermined intervals, means operated by the change in relative position of staid stamping element and work-holder to regulate the depth to which said stamping element may operate, and automatic means operated by the machine to stop the said machine at the end of the stamping operation.

43. A stamping machine comprising, in combination, a stamping element, a work-holder operatively positioned with respect to said stamping element, a control element operated in conjunction with said work-holder, means to lower and raise said stamping element into and out of engagement with the surface being stamped, means to intermittently rotate said work-holder in timed relation to the lowering and raising of the said stamping element, means for producing a stamping movement of said stamping element on being moved into engagement with the surface being stamped, means to move said last named means out of engagement with said stamping element as the said stamping element starts to rise from the stamped surface, means operated by said control element to change the relative position of said stamping element and work-holder at predetermined intervals, means operated by the change in relative position of the stamping element and work-holder to regulate the depth to which said stamping element may operate, and means operated by the said control element to stop the machine at the end of the stamping operation.

44. A stamping machine, comprising, in combination, a stamping element, a rotatable work-holder in operative relation to said stamping element, means to lower and raise said stamping element into and out of engagement with the surface being stamped, means to intermittently rotate said work-holder in timed relation to the lowering and raising of the said stamping element, means for producing a stamping movement of said stamping element on being moved into engagement with the surface being stamped, means to move said last named means out of engagement with said stamping element as the said stamping element starts to rise from the stamped surface, and means cooperating with said lowering and raising means to regulate the depth to which said stamping element may operate.

45. A stamping machine, comprising, in combination, a stamping element, a rotatable work-holder in operative relation to said stamping element, means to lower and raise said stamping element into and out of engagement with the surface being stamped, means to intermittently rotate said work-holder in timed relation to the lowering and raising of the said stamping element, means for producing a stamping movement of said stamping element on being moved into engagement with the surface being stamped, means to move said last named means out of engagement with said stamping element as the said stamping element starts to rise from the stamped surface, means cooperating with the said lowering and raising means to regulate the depth to which said stamping element may operate, and automatic means to stop the machine at the end of the stamping operation.

46. A stamping machine, comprising, in combination, a stamping element, a rotatabl work-holder in operative relation to said stamping element, a control element operating in conjunction with said work-holder, means to lower and raise said stamping element into and out of engagement with the surface being stamped, means to intermittently rotate said work-holder in timed relation to the lowering and raising of the said stamping element, means for producing a stamping movement of said stamping element on being moved into engagement with the surface being stamped, means to move said last named means out of engagement with said stamping element as the said stamping element starts to rise from the stamped surface, means cooperating with said lowering and raising means to regulate the depth to which said stamping element may operate, and means operated by said control element to stop the machine at the end of the stamping operations.

47. A stamping machine, comprising, in combination, a stamping element, means to lower and raise said stamping element into and out of engagement with the surface being stamped, means for producing a stamping movement of said stamping element on being moved into engagement with the surface being stamped, means to move said last named means out of engagement with said stamping element as the said stamping element starts to rise from the stamped surface, means operating in timed relation to the lowering and raising means to feed intermittently work past said stamping element, and means cooperating with said lowering and raising means to regulate the depth to which said stamping element may operate.

48. A stamping machine, comprising, in combination, a stamping element, means to lower and raise said stamping element into and out of engagement with the surface being stamped, means for producing a stamping movement of said stamping element on being moved into engagement with the surface being stamped, means to move said last named means out of engagement with said stamping element as the said stamping element starts to rise from the stamped surface, means operating in timed relation to the lowering and raising means to feed intermittently work past said stamping element, means cooperating with said lowering and raising means to regulate the depth to which said stamping element may operate, and means operated by said machine to automatically stop the said machine at the end of the stamping operation.

49. A stamping machine, comprising, in combination, a stamping element, means to lower and raise said stamping element into and out of engagement with the surface being stamped, means for producing a stamping movement of said stamping element on being moved into engagement with the surface being stamped, means to move said last named means out of engagement with said stamping element as the said stamping element starts to rise from the stamped surface, and means operated by said machine to stop automatically the said machine at the end of the stamping operation.

50. A stamping machine, comprising, in combination, a stamping element, a slide, a rotatable work-holder mounted on said slide and in operative relation to said stamping element, a pattern control cylinder mounted on said work-holder and rotatable therewith, means to progressively rotate said work-holder and control cylinder, means to lower and raise said stamping element into and out of engagement with the surface being stamped, means cooperating with said control cylinder to hold said work-holder in positive non-rotative position while said stamping element is in contact with the stamped surface, and means operated by said control cylinder to change the relative position of said work-holder and stamping element at predetermined intervals.

51. A stamping machine comprising, in combination, a stamping element, a rotatable work-holder, means to progressively rotate said work-holder, means to lower and raise said stamping holder, means to lower and raise said stamping element into and out of engagement with the surface being stamped, means to hold said work-holder in positive non-rotative position while said stamping element is in contact with the stamped surface, means to change the relative position of said work-holder and stamping element at predetermined intervals, and means operated during the change in relative position of said work-holder and stamping element to regulate the depth to which said stamping element may operate.

52. A stamping machine, comprising, in combination, a stamping element, a slide, a rotatable work-holder mounted on said slide and in operative relation to said stamping element, a pattern control cylinder mounted on said work-holder and rotatable therewith, means to progressively rotate said work-holder and control cylinder, means to lower and raise said stamping element into and out of engagement with the surface being stamped, means cooperating with said control cylinder to hold said work-holder in positive non-rotative position while said stamping element is in contact with the stamped surface, means operated by said control cylinder to change the relative position of said work-holder and stamping element at predetermined intervals, and means operated during the change in relative position of said work-holder and stamping element to regulate the depth to which said stamping element may operate.

53. A stamping machine comprising, in combination, a stamping element, a rotatable work-holder operatively positioned with respect to said stamping element, means to progressively rotate said work-holder, means to lower and raise said stamping element into and out of engagement with the surface being stamped, means cooperating with said last named means to regulate the depth to which said stamping element may be lowered, and means to hold said work-holder in positive non-rotative position while said stamping element is in contact with the surface to be stamped.

54. A stamping machine comprising, in combination, a stamping element, a work-holder operatively positioned with respect to said stamping element, a pattern control cylinder mounted on said work-holder, means to intermittently rotate said work-holder and control cylinder, means operating in timed relation to said last named means to lower and raise said stamping element into and out of contact with the surface being stamped, and means operated by said control cylinder to change the relative position of said stamping element and work-holder at predetermined intervals.

55. A stamping machine comprising, in combination, a stamping element, a work-holder operatively positioned with respect to said stamping element, a pattern control cylinder mounted on said work-holder, means to intermittently rotate said work-holder and control cylinder, means operating in timed relation to said last named means to lower and raise said stamping element into and out of contact with the surface being stamped, means operated by said control cylinder to change the relative position of said stamping element and work-holder at predetermined intervals, and means operated during the change in position of the stamping element and work-holder to vary the depth to which said stamping element may operate.

56. A stamping machine, comprising, in combination, a stamping element, a rotatable work-holder in operative relation to said stamping element, a pattern control element mounted on said work-holder and rotatable therewith, means to lower and raise said stamping element into and out of engagement with the surface to be stamped, means to intermittently rotate said work-holder and control cylinder in timed relation to the lowering and raising of said stamping element, means actuated by said control cylinder to change the relative position of said work-holder and stamping element at predetermined intervals, and means operated by the change in relative position of said stamping element and work-holder to regulate the depth to which said stamping element may operate.

57. A stamping machine comprising, in combination, a stamping element, a rotatable work-holder in operative relation to said stamping element, a pattern control cylinder operating in conjunction with said work-holder, means to lower and raise said stamping element into and out of engagement with the surface to be stamped, means to intermittently rotate said work-holder in timed relation to the lowering and raising of said stamping element, means actuated by said control cylinder to change the relative position of said work-holder and stamping element at predetermined intervals, and means operated by the change in relative position of said stamping element and work-holder to regulate the depth to which said stamping element may operate.

58. A stamping machine comprising, in combination, a stamping element, a rotatable work-holder in operative relation to said stamping element, means to lower and raise said stamping element into and out of contact with the surface to be stamped, means to intermittently rotate said work-holder in timed relation to the lowering and raising of the said stamping element, and means cooperating with said lowering and raising means to regulate the depth to which said stamping element may operate.

59. A stamping machine comprising, in combination, a stamping element, means to lower and raise said stamping element into and out of contact with the surface to be stamped, means operating in timed relation to the lowering and raising means to feed intermittently work past said stamping element, and means cooperating with said lowering and raising means to regulate the depth to which said stamping element may operate.

60. A stamping machine comprising, in combination, a stamping element, a rotatable work-holder in operative relation to said stamping element, means to intermittently rotate said work-holder, means to hold said work-holder in positive non-rotative engagement during the stamping operation, means for producing a stamping movement of said stamping element, means to move said last named means out of engagement with said stamping element at the termination of the stamping operation, and means to automatically control the depth to which said stamping element operates.

61. A stamping machine comprising, in combination, a stamping element, a rotatable work-holder in operative relation to said stamping element, means to intermittently rotate said work-holder, means to hold said work-holder in positive non-rotative engagement during the stamping operation, means for producing a stamping movement of said stamping element, means to move said last named means out of engagement with said stamping element at the termination of the stamping operation, means to automatically control the depth to which said stamping element operates, and means to stop automatically the machine at the end of the stamping operation.

62. A stamping machine comprising, in combination, a stamping element, a rotatable work-holder operatively positioned with respect to said stamping element, a pattern control cylinder mounted on said work-holder and rotatable therewith, means to rotate intermittently said work-holder and pattern control cylinder, means cooperating with said control cylinder to hold said work-holder in positive non-rotative position during the stamping operation, means for producing a stamping movement of said stamping element, means to move said last named means out of engagement with said stamping element at the termination of the stamping operation, and means to automatically control the depth to which said stamping element operates.

63. A stamping machine comprising, in combination, a stamping element, a rotatable work-holder operatively positioned with respect to said stamping element, a pattern control cylinder mounted on said work-holder and rotatable therewith, means to rotate intermittently said work-holder and pattern control cylinder, means cooperating with said control cylinder to hold said work-holder in positive non-rotative position during the stamping operation, means for producing a stamping movement of said stamping element, means to move said last named means out of engagement with said stamping element at the termination of the stamping operation, means to automatically control the depth to which said stamping element operates, and means operated by said control cylinder to stop the machine at the end of the stamping operation.

64. A stamping machine comprising, in combination, a stamping element, a rotatable work-holder in operative relation to said stamping element, means to intermittently rotate said work-holder, means to hold said work-holder during stamping operation, means for producing a stamping movement of said stamping element, and means to move said last named means out of engagement with the stamping element at the end of the stamping movement.

65. A stamping machine comprising, in combination, a stamping element, a rotatable work-holder in operative relation to said stamping element, means to intermittently rotate said work-holder, means to hold said work-holder during stamping operation, means for producing a stamping movement of said stamping element, means to move said last named means out of engagement with the stamping element at the end of the stamping movement, and means to stop automatically the machine at the end of the stamping operation.

66. A stamping machine comprising, in combination, a reciprocated stamping element, a rotatable work-holder in operative relation to said stamping element, a control cylinder mounted on said work-holder and rotatable therewith, means to intermittently rotate said work-holder and control cylinder, means cooperating with said control cylinder to hold said work-holder in positive non-rotative position during the stamping movement, means for producing a stamping movement of said stamping element, means to move said last named means out of engagement with said stamping element at the end of the stamping movement, and means to automatically stop the machine at the end of the stamping operations.

67. A stamping machine comprising, in combination, a reciprocated stamping element, a rotatable work-holder, means to progressively rotate said work-holder, means for producing a stamping movement of said stamping element on being moved into engagement with the surface being stamped, means to move said last named means out of engagement with said stamping element as the stamping element starts to rise from the stamped surface, and means operated by the said machine to vary the depth to which the stamping element may operate.

68. A stamping machine, comprising, in combination, a reciprocated stamping element, a rotatable work-holder, means to progressively rotate said work-holder, means for producing a stamping movement of said stamping element on being moved into engagement with the surface being stamped, means to move said last named means out of engagement with said stamping element as the stamping element starts to rise from the stamped surface, means operated by the said machine to vary the depth to which the stamping element may operate, and automatic means to stop the machine at the end of the stamping operation.

69. A stamping machine comprising, in combination, a reciprocated stamping element, a rotatable work-holder in operative relation to said stamping element, means to progressively rotate said work-holder, means for producing a stamping movement of said stamping element on being moved into engagement with the surface to be stamped, and means to move said last named means out of engagement with said stamping element as said stamping element starts to rise from the stamped surface.

70. A stamping machine comprising, in combination, a reciprocated stamping element, a rotatable work-holder in operative relation to said stamping element, means to progressively rotate said work-holder, means for producing a stamping movement of said stamping element on being moved into engagement with the surface to be stamped, means to move said last named means out of engagement with said stamping element as said stamping element starts to rise from the stamped surface, and automatic means to stop the machine at the end of the stamping operation.

71. A stamping machine comprising, in combination, a reciprocated stamping element, a rotatable work-holder in operative relation to said stamping element, means to progressively rotate said work-holder, means for producing a stamping movement of said stamping element on being moved into engagement with the surface being stamped, means to move said last named means out of engagement with said stamping element as the stamping element starts to rise from the stamped surface, automatic means to change the relative position of said stamping element and work-holder at predetermined intervals, and means operated during the change in relative position of said stamping element and work-holder to vary the depth to which said stamping element may operate.

72. A stamping machine comprising, in combination, a reciprocated stamping element, a rotatable work-holder in operative relation to said stamping element, means to progressively rotate said work-holder, means for producing a stamping movement of said stamping element on being moved into engagement with the surface being stamped, means to move said last named means out of engagement with said stamping element as the stamping element starts to rise from the stamped surface, automatic means to change the relative position of said stamping element and work-holder at predetermined intervals, means operated during the change in relative position of said stamping element and work-holder to vary the depth to which said stamping element may operate, and means to automatically stop the machine at the end of the stamping operation.

73. A stamping machine comprising, in combination, a stamping spindle and stamping element attached thereto, means to drive said spindle downwardly, and means operated and controlled solely by the machine for regulating the depth to which said spindle may be driven, said last mentioned means comprising a wedge member operating in timed relation with said spindle driving means.

74. A stamping machine comprising, in combination, a stamping element, means to lower and raise said stamping element into and out of contact with the surface to be stamped, means operating in timed relation to the lowering and raising means to feed work past the stamping element intermittently, and means operated and controlled solely by the machine to regulate the stroke of said stamping element.

75. A stamping machine comprising, in combination, a stamping element, means to lower and raise said stamping element into and out of engagement with the surface being stamped, means for producing a stamping movement of said stamping element on being moved into engagement with the surface being stamped, means to move said last-named means out of engagement with said stamping element as the said stamping element starts to rise from the stamped surface, means operating in timed relation to the lowering and raising means to feed work past said stamping element intermittently, and means operated and controlled solely by the machine to regulate the stroke of said stamping element.

76. A stamping machine for use in the manufacture of spinnerettes comprising, in combination, a stamping element, means to drive said element downwardly comprising a reciprocated hammer, means to lift and release said hammer, and means in operative relation with said element for regulating the depth to which said element may be driven, said last mentioned means arranged for operation in timed relation with said element-driving means.

MAX SCHNEIDER.